(12) United States Patent
Tarlow et al.

(10) Patent No.: US 11,562,239 B2
(45) Date of Patent: Jan. 24, 2023

(54) OPTIMIZING SPARSE GRAPH NEURAL NETWORKS FOR DENSE HARDWARE

(71) Applicant: Google LLC, Mountain View, CA (US)

(72) Inventors: Daniel S. Tarlow, Montreal (CA); Matej Balog, Bratislava (SK); Bart van Merrienboer, Montreal (CA); Yujia Li, London (GB); Subhodeep Moitra, St Jerome (CA)

(73) Assignee: Google LLC, Mountain View, CA (US)

(*) Notice: Subject to any disclaimer, the term of this patent is extended or adjusted under 35 U.S.C. 154(b) by 462 days.

(21) Appl. No.: 16/883,209

(22) Filed: May 26, 2020

(65) Prior Publication Data
US 2020/0372355 A1    Nov. 26, 2020

Related U.S. Application Data
(60) Provisional application No. 62/852,253, filed on May 23, 2019.

(51) Int. Cl.
*G06N 3/08* (2006.01)
*G06F 17/16* (2006.01)
(Continued)

(52) U.S. Cl.
CPC .............. *G06N 3/08* (2013.01); *G06F 17/16* (2013.01); *G06N 3/082* (2013.01); *G06N 5/003* (2013.01); *G06N 20/00* (2019.01)

(58) Field of Classification Search
None
See application file for complete search history.

(56) References Cited

U.S. PATENT DOCUMENTS

| 8,527,569 B2* | 9/2013 | Nakanishi | G06F 17/16 708/446 |
| 2016/0224473 A1* | 8/2016 | Acar | G06F 16/328 |

(Continued)

OTHER PUBLICATIONS

Mocanu et al., Sparse matrix permutations to a Block Triangular Form in a distributed environment, Conference: Intelligent Computer Communication and Processing (ICCP), 2013 IEEE, Sep. 2013.*

(Continued)

*Primary Examiner* — David J Stoltenberg
(74) *Attorney, Agent, or Firm* — Fish & Richardson P.C.

(57) ABSTRACT

A computer-implemented method for computing node embeddings of a sparse graph that is an input of a sparse graph neural network is described. Each node embedding corresponds to a respective node of the sparse graph and represents feature information of the respective node and a plurality of neighboring nodes of the respective node. The method includes: receiving an adjacency matrix that represents edges of the sparse graph; receiving a weight matrix representing, for each node of the sparse graph, a level of influence of respective neighboring nodes on the node; initializing, for each node of the sparse graph, a respective node embedding; transforming the adjacency matrix into a low-bandwidth adjacency matrix, and performing the following operations at least once: generating a message propagation matrix as a product of the low-bandwidth adjacency matrix, the node embeddings of the nodes, and the weight matrix, wherein the message propagation matrix represents message propagation among the nodes of the sparse graph, and updating the node embeddings of the sparse graph by processing the message propagation matrix and the node embeddings of the nodes using an encoder neural network of the sparse graph neural network.

24 Claims, 3 Drawing Sheets

(51) Int. Cl.
  *G06N 20/00* (2019.01)
  *G06N 5/00* (2006.01)

(56) References Cited

U.S. PATENT DOCUMENTS

| | | | |
|---|---|---|---|
| 2017/0147287 A1* | 5/2017 | Acar | G06F 7/08 |
| 2019/0188241 A1* | 6/2019 | Fick | G11C 11/54 |
| 2019/0278600 A1* | 9/2019 | Frumkin | G06N 3/0472 |
| 2020/0104747 A1* | 4/2020 | Nation | G06F 17/16 |

OTHER PUBLICATIONS

Erguiz et al., Assessing sparse triangular linear system solvers on GPUs, 2017 29th International Symposium on Computer Architecture and High Performance Computing Workshops.*
Gonzalez et al., Solving Sparse Triangular Systems on Distributed Memory Multicomputers, Proceedings of the Sixth Euromicro Workshop on Parallel and Distributed Processing, Jan. 1, 1998.*
Joshi et al., A High Performance Two Dimensional Scalable Parallel Algorithm for Solving Sparse Triangular Systems, Proceedings. Fourth International Conference on High-Performance Computing, 1997.*
Anzt et al., Batched Generation of Incomplete Sparse Approximate Inverses on GPUs, 2016 7th Workshop on Latest Advances in Scalable Algorithms for Large-Scale Systems.*
Behrisch et al., Matrix Reordering Methods for Table and Network Visualization, EuroVis 2016, vol. 35 (2016), No. 3.*
Akiba et al, "Extremely large minibatch SGD: training ResNet-50 on ImageNet in 15 minutes" 2017, arXiv, 4 pages.
Allamanis et al, "Learning to represent programs with graphs" 2018, ICLR, 17 pages.
Bell et al, "Implementing sparse matrix-vector multiplication on throughput-oriented processors" 2009, Proceedings of the Conference on High Performance Computing Networking, 11 pages.
Cho et al, "Learning phrase representations using RNN encoder-decoder for statistical machine translation" 2014, EMNLP, 15 pages.
Cuthill et al, Reducing the bandwidth of sparse symmetric matrices, 2014, ACM, 16 pages.
Dai et al, "Learning steady-states of iterative algorithms over graphs" 2018, ICML, 9 pages.
Diaz et al, "A survey of graph layout problems" 2002, ACM Computing Surveys, 44 pages.
Gilmer et al, "Neural message passing for quantum chemistry" 2017, ICML, 14 pages.
Goyal et al, "Accurate, large minibatch SGD: Training ImageNet in 1 hour" 2017, arXiv, 12 pages.
Gray et al, "GPU kernels for block-sparse weights" 2017, Github, 12 pages.
Hamilton et al, "Inductive representation learning on large graphs" NIPS, 2017, 11 pages.
Hennessy et al, "A new golden age for computer architecture" 2019, ACM, 13 pages.
Jia et al, "Highly scalable deep learning training system with mixed-precision: Training imagenet in four minutes" 2018, arXiv, 9 pages.
LeCun et al, "Deep learning" 2015, Nature, 9 pages.
Li et al, "Gated graph sequence neural networks" 2016, ICLR, 20 pages.
Ma et al, "Towards efficient large-scale graph neural network computing" 2018, arXiv, 14 pages.
Narang et al, "Block-sparse recurrent neural networks" 2017, arXiv, 12 pages.
Saad, "Iterative methods for sparse linear systems" 2003, Society for Industrial and Applied Mathematics, 567 pages.
Scarselli et al, "The graph neural network model" 2009, IEEE Transactions on Neural Networks, 15 pages.
numpy.org [online] "NumPy version 1.16", 2019 [retrieved on Jun. 2020] retrieved from URL https://docs.scipy.org/doc/numpy/reference/generated/numpy.einsum.htmll>, 9 pages.
Shallue et al, "Measuring the effects of data parallelism on neural network training" 2018, arXiv, 49 pages.
Simonyan et al, "Very deep convolutional networks for large-scale image recognition" 2015, ICLR1 14 pages.
Tinney et al, "Direct solutions of sparse network equations by optimally ordered triangular factorization" 1967, Proceedings of the IEEE, 9 pages.
Wang et al, "Deep graph library: Towards efficient and scalable deep learning on graphs" 2019, ICLR Workshop on Representation Learning on Graphs and Manifolds, 7 pages.
Wu et la, "A comprehensive survey on graph neural networks" 2019, arXiv, 22 pages.
Xie et al, "Aggregated residual transformations for deep neural networks" 2017, CVPR, 10 pages.
You et al, "Imagenet training in minutes" 2018, Proceedings of the 47th International Conference on Parallel Processing, 10 pages.
Zhou et al, "Graph neural networks: A review of methods and applications" 2018, arXiv, 20 pages.

* cited by examiner

OPTIMIZING SPARSE GRAPH NEURAL NETWORKS FOR DENSE HARDWARE

CROSS REFERENCE TO RELATED APPLICATIONS

This application is a non-provisional of and claims priority to U.S. Provisional Patent Application No. 62/852,253, filed on May 23, 2019, the entire contents of which are hereby incorporated by reference.

BACKGROUND

This specification relates to a neural network system for optimizing a sparse graph neural network for dense hardware.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a neural network system implemented as computer programs on one or more computers in one or more locations that optimizes a sparse graph neural network for dense hardware.

The subject matter described in this specification can be implemented in particular embodiments so as to realize one or more of the following advantages. The techniques described in this specification adapt the computation performed by a sparse graph neural network (GNN) to make it efficient on dense hardware by applying bandwidth reduction to an adjacency matrix that represents edges of an input sparse graph of the sparse GNN, implementing graph neural network message propagation for the resulting low-bandwidth adjacency matrix, and updating the node embeddings of the input sparse graph accordingly. As a result, the sparse GNN can be effectively deployed on the dense hardware to realize the following technical advantages. Dense hardware is capable of performing dense linear algebra operations such as dense matrix-matrix multiplication. Therefore, sparse GNNs implemented on dense hardware requires significantly less training and inference time while still achieves similar or better performance compared to those implemented on conventional hardware such as GPUs. Further, because the low-bandwidth structure in an adjacency matrix of an input graph to a sparse GNN can be obtained, the described techniques allow for expression of GNN message propagation in terms of three applications of a dense batched matrix multiply primitive (which is shown in Eq. 3 below). Thus, systems that implement sparse GNNs on dense hardware are more computational efficient than prior systems because the cost of a step of densified GNN propagation can be reduced, for example, from $O(N^2H)$ to $O(NBH)$, where N is the number of nodes, B is a bandwidth of the input graph, and H is the hidden dimension.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
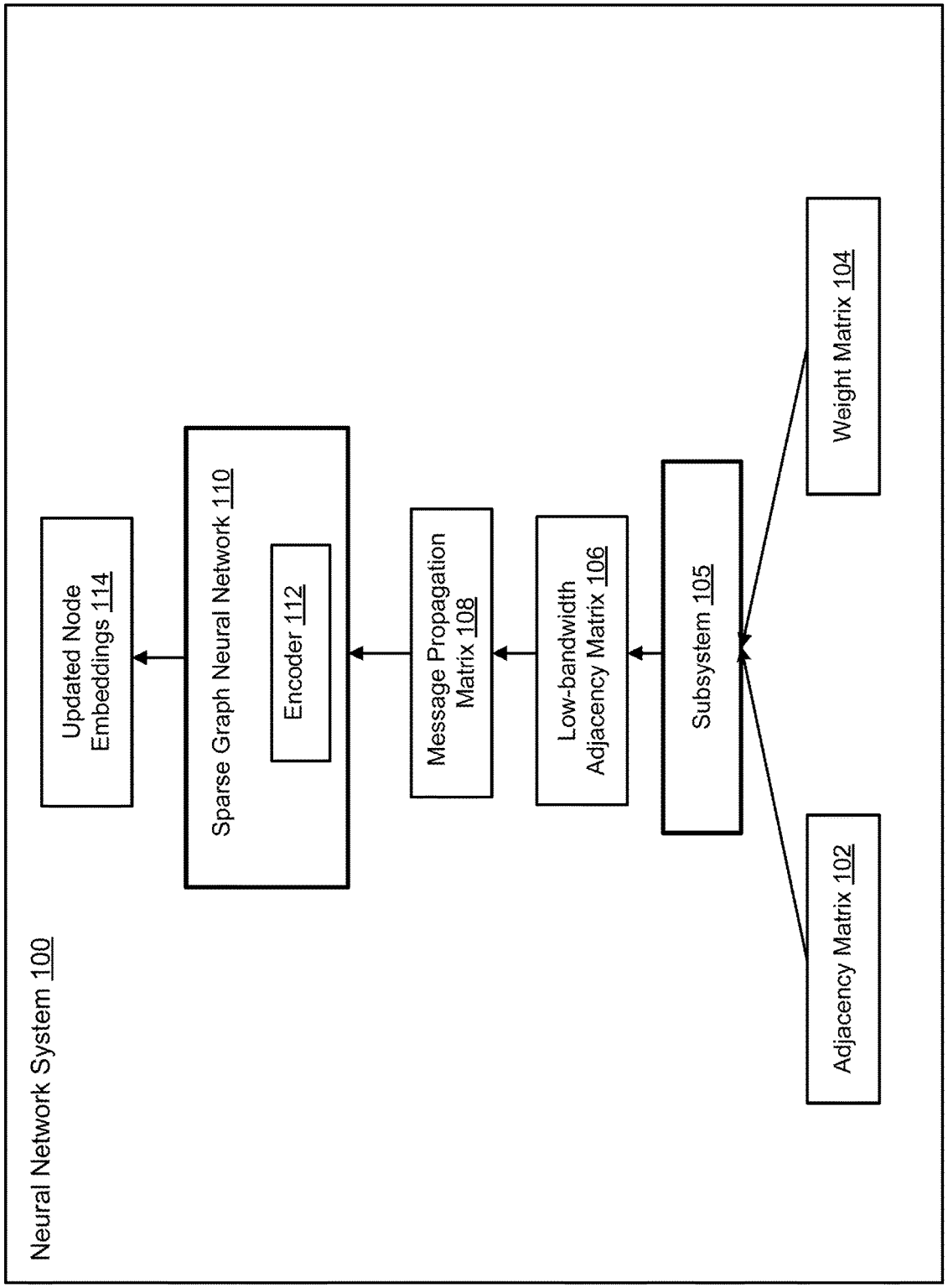
FIG. 1 shows an example neural network system.

Graph neural networks may be used in many different applications due to their ability to naturally encode relational input data and their ability to scale to large graphs by operating on a sparse representation of graph adjacency matrices. For example, graph neural networks may be used for searching and retrieval from large databases of molecules, generation of similar molecules to a particular molecule, for example for drug discovery, determining alternative network architectures and vulnerabilities in network architectures, determining alternative traffic routes, and determining variants of computer viruses.

A graph neural network can be configured to receive as input a graph. For example, a graph may represent a drug molecule, a computer network, a transportation network, a computer chip, a warehouse layout for control of a robotic system in the warehouse; an item of manufacture which may be used to control a robotic system to assemble, disassemble or repair the item; a graph may represent a physical location and may be used by an autonomous agent such as a self-driving vehicle to navigate through the physical location. It will be appreciated that there exists many other technical applications for generated graph structures.

In general, a graph comprises a set of nodes and a set of edges that connect two nodes.

A node of a graph may be used to represent a particular entity in a physical system and may have a type based upon a type of the entity. For example, a node may represent a particular atom of a molecule, the atom being of a particular type of chemical element. A feature vector may be associated with a node. The feature vector may represent the type of node and other properties of the entity represented by the node.

An edge of a graph may be used to represent a relationship between two nodes connected by the edge. For example, an edge may represent a chemical bond between two atoms or may represent a communication link between two nodes of a network. Edges may also have a type associated with, for example, if a communication link is a wired or wireless link. A feature vector may be associated with an edge. The feature vector may represent the type of edge and other properties associated with the edge. Edges may be directed or undirected. An undirected edge may be represented using a pair of directed edges having opposing directions.

A sparse graph neural network is a neural network that is configured to receive as input a sparse graph and to generate an output for the sparse graph. In contrast to a dense graph which is a graph in which the number of edges is close to the maximal number of edges, a sparse graph is a graph in which the number of edges is close to the minimal number of edges. In other words, a sparse graph is a graph in which the number edges is close to O(n), where n is the number of vertices, while a dense graph is a graph in which the number of edges is close to $O(n^2)$.

To optimize performance of a sparse graph neural network, the neural network system described in this specification implements the sparse graph neural network on dense hardware. Dense hardware is capable of performing dense linear algebra operations such as dense matrix-matrix multiplication. Examples of dense hardware include Google's Tensor Processing Units (TPU), Intel's Nervana Neural Network Processor, and Nvidia's Volta architecture, which use domain specific architectures to perform matrix multiplication. Therefore, sparse graph neural networks implemented on dense hardware requires significantly less training and inference time while still achieves similar or better performance compared to those implemented on conventional hardware such as GPUs.

FIG. 1 shows an example of the neural network system. The neural network system 100 is an example of a system implemented as computer programs on one or more computers in one or more locations, in which the systems, components, and techniques described below can be implemented.

The neural network system 100 includes a sparse graph neural network 110 and a subsystem 105. The sparse graph neural network 110 includes an encoder neural network 112 (also referred to as "the encoder 112" for simplicity).

Generally, the sparse graph neural network 110 is configured to receive as input a sparse graph that has N nodes and initial node embeddings $E^{(0)} \in \mathbb{R}^{N \times H}$, where H is the hidden dimension of the sparse graph. Each of the node embeddings corresponds to a respective node of the sparse graph and represents feature information of the respective node and a plurality of neighboring nodes of the respective node. The encoder 112 is configured to process the sparse graph and, after a fixed number T of time steps, generates final node embeddings $E^{(T)} \in \mathbb{R}^{N \times H}$ that combine local and neighborhood information.

In each time step, each node computes a message from its current node embedding using a linear map parametrized by a learnable weight matrix $W \in \mathbb{R}^{H \times H}$, and broadcasts the message to all of its neighboring nodes. The weight matrix represents, for each node of the sparse graph, a level of influence of respective neighboring nodes on the node. For each node, the sparse graph neural network 110 sums up the messages that the node received and updates the respective node embedding using the encoder neural network 112. For example, the encoder neural network 112 is a recurrent neural network such as a Gated Recurrent Unit (GRU). Let $A \in \{0,1\}^{N \times N}$ denote the (transposed) adjacency matrix that represents edges of the sparse graph ($a_{ij}=1$ if there is an edge from j to i). Then the forward pass of the encoder neural network 112 can be expressed as:

$$E^{(t+1)} = \mathrm{GRU}(AE^{(t)}W, E^{(t)}) \text{ for } t=0,1,\ldots,T-1, \quad (1)$$

where GRU( ) denotes the encoder neural network 112. The forward pass of the encoder neural network 112 can be interpreted as nodes exchanging messages with each other along edges of the sparse graph A, combining the local per-node information with information about the surrounding context in a flexible manner.

In some implementations when edges of the sparse graph are of P discrete types, separate weights $W_p$ are used to parametrize the map from embeddings to messages for each edge type as follows:

$$E^{(t+1)} = \mathrm{GRU}(\Sigma_{p=1}^{P} A_p E^{(t)} W_p, E^{(t)}),$$

where $A_p$ only includes edges of type p.

The sparse graph neural network 110 can use the final node embedding $E^{(T)}$ to generate an output of the network 110. For example, the final node embedding $E^{(T)}$ can be used directly (e.g., for node classification) or pooled together into an embedding of the whole sparse graph. As another example, the final node embedding $E^{(T)}$ can be fed into an output layer that is configured to, for each graph, classify the types of the nodes in the graph and selects a particular node that satisfies requirements of a task that the network 110 is configured to perform.

In order to facilitate the implementation of a sparse graph neural network 110 on dense hardware (e.g., to train the sparse graph neural network 110 on dense hardware to perform a machine learning task using the input sparse graph), the neural network system 100 uses techniques that apply bandwidth reduction to the adjacency matrix A (or $A_p$) that represents edges of the input sparse graph, implement graph neural network message propagation for the resulting low-bandwidth adjacency matrix, and update the node embeddings accordingly.

More specifically, as shown in FIG. 1, the neural network system 100 receives an adjacency matrix 102 that represents edges of the sparse graph that is an input of the sparse graph neural network 110. The system 100 receives a weight matrix 104, denoted as $W \in \mathbb{R}^{H \times H}$ that represents, for each node of the sparse graph, a level of influence of respective neighboring nodes on the node. The system 100 initializes, for each node of the sparse graph, a respective node embedding. The initialized node embeddings are denoted as $E^{(0)} \in \mathbb{R}^{N \times H}$. The system 100 may initialize the node embeddings using data received from a user of the system 100 or from another system.

The system 100 transforms the adjacency matrix 102 into a low-bandwidth adjacency matrix 106 using the subsystem 105. In particular, given the adjacency matrix 102 of the sparse graph, the subsystem 105 permutes the nodes in the sparse graph to obtain the low-bandwidth adjacency matrix 106 having a bandwidth B, where B is a non-negative integer, and where all non-zero elements of the low-bandwidth adjacency matrix 106 lie at a distance not greater than B from a main diagonal of the low-bandwidth adjacency matrix 106. The subsystem 105 may permute the nodes to expose reduced bandwidth structure using a heuristic algorithm (for example, Reverse Cuthill-McKee (RCMK) algorithm).

The low-bandwidth adjacency matrix 106 includes diagonal blocks, upper-triangular blocks, lower-triangular blocks, and zero elements outside of the diagonal, upper-triangular, and lower-triangular blocks.

For example, the low-bandwidth adjacency matrix 106 is a square, block diagonal matrix with K equal block sizes S, i.e., with overall shape KS×KS. The block size can be chosen depending on the bandwidth B. For example, the block size is chosen such that B<S−1. The low-bandwidth adjacency matrix 106 can be denoted as matrix A which has the following form:

$$\begin{bmatrix} C_1 & U_2 & & & \\ L_1 & C_2 & U_3 & & \\ & \ddots & \ddots & \ddots & \\ & & L_{k-2} & C_{k-1} & U_k \\ & & & L_{k-1} & C_k \end{bmatrix},$$

where the blocks $\{C_i\}^{i=1,\ldots,k}$, $\{U_i\}^{i=1,\ldots,k}$, and $\{L_i\}^{i=1,\ldots,k}$ are all S×S matrices, $\{C_i\}^{i=1,\ldots,k}$ are diagonal blocks, $\{U_i\}^{i=1,\ldots,k}$ are lower-triangular blocks, and $\{L_i\}^{i=1,\ldots,k}$ are upper-triangular blocks.

The system 100 then generates a message propagation matrix 108 as a product of the low-bandwidth adjacency matrix 106 and the current node embeddings of the nodes of the sparse graph. The message propagation matrix 108 represents message propagation among the nodes of the sparse graph.

The message propagation matrix 108 can be computed as A×E=

$$\begin{bmatrix} C_1 & U_2 & & & \\ L_1 & C_2 & U_3 & & \\ & \ddots & \ddots & \ddots & \\ & & L_{k-2} & C_{k-1} & U_k \\ & & & L_{k-1} & C_k \end{bmatrix} \quad (3)$$

$$\begin{bmatrix} E_1 \\ E_2 \\ \vdots \\ E_{k-1} \\ E_k \end{bmatrix} = \begin{bmatrix} C_1 E_1 \\ C_2 E_2 \\ \vdots \\ \\ C_k E_k \end{bmatrix} + \begin{bmatrix} U_2 E_2 \\ U_3 E_3 \\ \vdots \\ U_k E_k \\ 0 \end{bmatrix} + \begin{bmatrix} 0 \\ L_1 E_1 \\ L_2 E_2 \\ \vdots \\ L_{k-1} E_{k-1} \end{bmatrix}$$

where A denotes the low-bandwidth adjacency matrix 106 and E denotes the current node embeddings of the sparse graph.

To compute the message propagation matrix 108, the system 100 loads the low-bandwidth adjacency matrix 106 and the current node embeddings to a dense hardware device for dense matrix computations (or batch matrix computations (BMM)). The system 100 then performs multiple dense matrix multiplications on the dense hardware device to compute three matrices on the right-hand side of Eq. 3. These dense matrix multiplications are fast on dense hardware.

In particular, the system 100 performs multiple dense matrix multiplications including a multiplication of a diagonal block $C_i$ in the low-bandwidth adjacency matrix 106 with a corresponding sub-matrix in the node embeddings. For example, to compute the first matrix on the right-hand side of Eq. 3, the system 100 performs multiple dense matrix multiplications: $C_1E_1, C_2E_2, \ldots, C_kE_k$.

The multiple dense matrix multiplications further include a multiplication of an upper-triangular block $U_i$ in the low-bandwidth adjacency matrix 106 with a corresponding sub-matrix in the node embeddings. For example, to compute the second matrix on the right-hand side of Eq. 3, the system 100 performs multiple dense matrix multiplications: $U_2E_2, U_3E_3, \ldots, U_kE_k$.

The multiple dense matrix multiplications further include a multiplication of a lower-triangular block $L_i$ in the low-bandwidth adjacency matrix with a corresponding sub-matrix in the node embeddings. For example, to compute the third matrix on the right-hand side of Eq. 3, the system 100 performs multiple dense matrix multiplications: $L_1E_1, L_2E_2, \ldots, L_{k-1}E_{k-1}$.

The system 100 then updates the node embeddings of the sparse graph by processing the message propagation matrix 108, the node embeddings of the nodes, and the weight matrix 104 using the encoder neural network 112 of the sparse graph neural network 110. The encoder neural network 112 processes the message propagation matrix 108, the node embeddings of the nodes, and the weight matrix 104 to update the node embeddings based on Eq. 1:

$$E^{(t+1)} = \text{GRU}(AE^{(t)}W, E^{(t)}) \text{ for } t=0,1,\ldots,T-1 \quad (1)$$

The system 100 may repeat the above process to update the node embeddings and use the updated node embeddings to compute an output of the sparse graph neural network 110 or to train the sparse graph neural network 110 on the dense hardware device.

In particular, at inference time, the system 100 can use the updated node embeddings obtained after the T time steps to compute an output of the sparse graph neural network 110. For example, the final node embedding $E^{(T)}$ can be used directly (e.g., for node classification), pooled together into an embedding of the whole sparse graph, or fed into an output layer of the that for each graph selects a particular node.

At training time, the system 100 can use the updated node embeddings 114 to train the sparse graph neural network 110 on a machine learning task. The training of the sparse graph neural network 110 is performed on the dense hardware device. In particular, the system 100 updates values of parameters of the sparse graph neural network 110 by optimizing a loss function associated with the machine learning task using the updated node embeddings.

In each training time step, the system 100 chooses the block size S based on the bandwidth B. For example, the block size is chosen such that B<S-1. However, in some implementations, the system 100 can still apply the low-bandwidth message passing to sparse graphs that violate the assumption B<S-1, but will ignore some of their edges (i.e., messages are not passed along them). Specifically, edges (i;j) with |i−j|<S are always taken into account, those with S≤|i−j|<2S are sometimes taken into account, and those with |i−j|>2S are always ignored.

Because the low-bandwidth structure in the adjacency matrix of the input spare graph to the sparse graph neural network 110 can be obtained, the above-described techniques allows for expression of GNN message propagation in terms of three applications of a dense batched matrix multiply primitive shown in Eq. 3. Thus, systems that implement sparse GNNs on dense hardware are more computational efficient than prior systems because the cost of a step of densified GNN propagation can be reduced, for example, from O(N2H) to O(NBH), where N is the number of nodes, B is a bandwidth of the input sparse graph, and H is the hidden dimension of the sparse graph.

Figure 2:
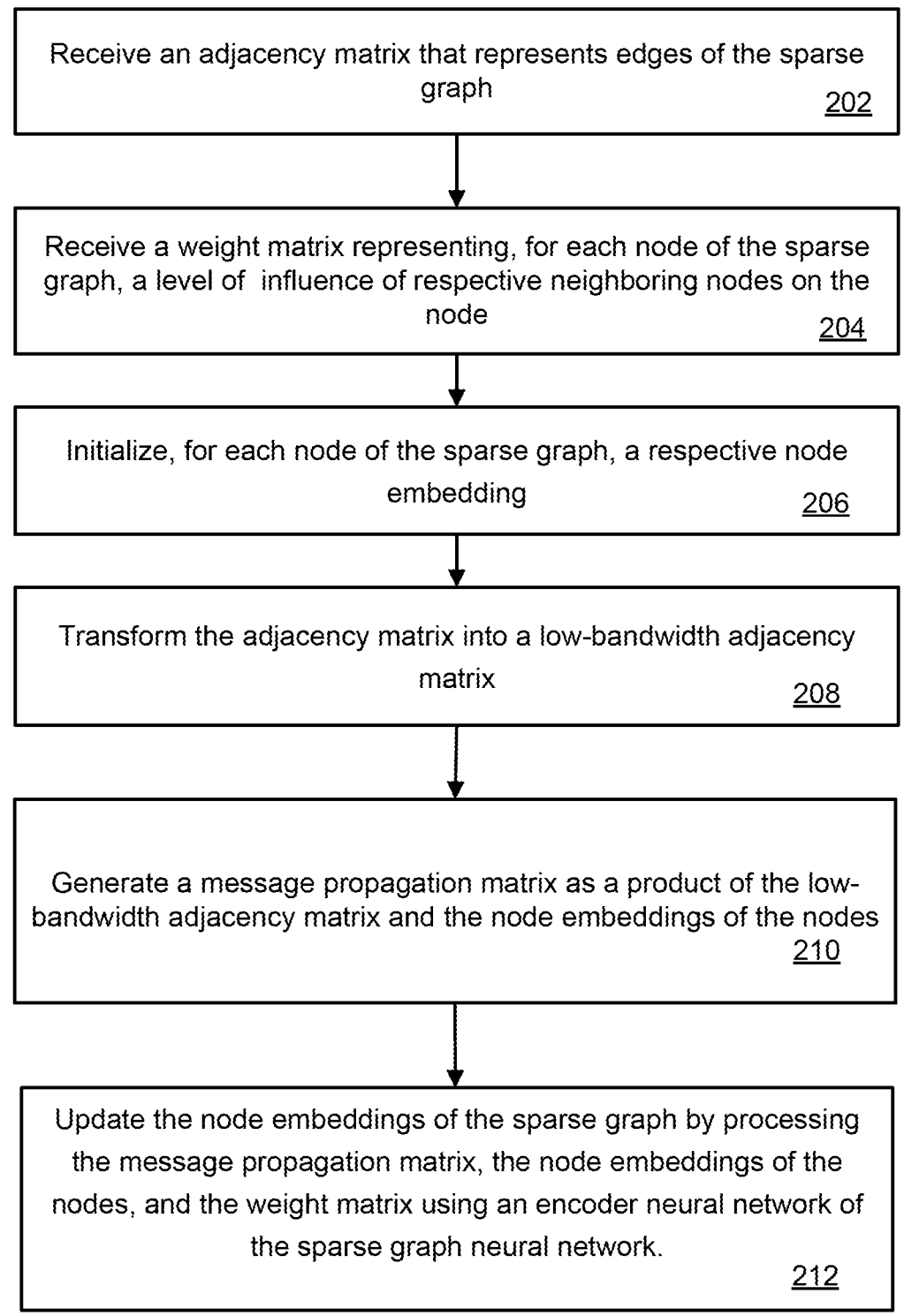
FIG. 2 is a flow diagram of an example process for updating node embeddings of a sparse graph.

FIG. 2 is a flow diagram of an example process for updating node embeddings of a sparse graph. For convenience, the process 200 will be described as being performed by a system of one or more computers located in one or more locations. For example, a neural network system, e.g., the network system 100 of FIG. 1, appropriately programmed in accordance with this specification, can perform the process 200.

Generally, the system is configured to update node embeddings of a sparse graph that is an input of the sparse graph neural network. Each node embedding corresponds to a respective node of the sparse graph and represents feature information of the respective node and a plurality of neighboring nodes of the respective node. The sparse graph neural network includes an encoder neural network.

Specifically, the system receives an adjacency matrix that represents edges of the sparse graph (step 202).

The system receives a weight matrix that represents, for each node of the sparse graph, a level of influence of respective neighboring nodes on the node (step 204).

The system initializes, for each node of the sparse graph, a respective node embedding (step 206). The system may initialize the node embeddings using data received from a user of the system or from another system.

The system transforms the adjacency matrix into a low-bandwidth adjacency matrix (step 208).

More specifically, to transform the adjacency matrix into the low-bandwidth adjacency matrix, the system permutes the nodes in the sparse graph to obtain the low-bandwidth adjacency matrix having a bandwidth B, where B is a non-negative integer, and where all non-zero elements of the low-bandwidth adjacency matrix lie at a distance not greater than B from a main diagonal of the low-bandwidth adjacency matrix. The system can permute the nodes in the sparse graph by using a heuristic algorithm, such as a Reverse Cuthill McKee (RCMK) algorithm.

The low-bandwidth adjacency matrix includes diagonal blocks, upper-triangular blocks, lower-triangular blocks, and zero elements outside of the diagonal, upper-triangular, and lower-triangular blocks.

For example, the low-bandwidth adjacency matrix is a square, block diagonal matrix with K equal block sizes S, i.e., with overall shape KS×KS. The block size can be chosen depending on the bandwidth B. For example, the block size is chosen such that B≤S−1. The low-bandwidth adjacency matrix 106 can be denoted as matrix A which has the following form:

$$\begin{bmatrix} C_1 & U_2 & & & \\ L_1 & C_2 & U_3 & & \\ & \ddots & \ddots & \ddots & \\ & & L_{k-2} & C_{k-1} & U_k \\ & & & L_{k-1} & C_k \end{bmatrix},$$

where the blocks $\{C_i\}^{i=1,\ldots,k}$, $\{U_i\}^{i=1,\ldots,k}$, and $\{L_i\}^{i=1,\ldots,k}$, are all S×S matrices, $\{C_i\}^{i=1,\ldots,k}$ are diagonal blocks, $\{U_i\}^{i=1,\ldots,k}$ are lower-triangular blocks, and $\{L_i\}^{i=1,\ldots,k}$ are upper-triangular blocks.

The system then performs steps 210 and 212 below at least once.

The system generates a message propagation matrix as a product of the low-bandwidth adjacency matrix and the node embeddings of the nodes (step 210). First, the system loads the low-bandwidth adjacency matrix and the current node embeddings to a dense hardware device for dense matrix computations (or batch matrix computations (BMM)). The system then performs multiple dense matrix multiplications on the dense hardware device to generate the message propagation matrix. These dense matrix multiplications are fast on dense hardware.

The process for generating the message propagation matrix is described in detail below with reference to FIG. 3.

The system updates the node embeddings of the sparse graph by processing the message propagation matrix, the node embeddings of the nodes, and the weight matrix using an encoder neural network of the sparse graph neural network. The encoder neural network can be a recurrent neural network such as a Gated Recurrent Unit (GRU).

The encoder neural network processes the message propagation matrix AE, the node embeddings of the nodes E, and the weight matrix W to update the node embeddings based on Eq. 1:

$$E^{(t+1)} = \text{GRU}(AE^{(t)} W, E^{(t)}) \text{ for } t=0,1,\ldots,T-1 \quad (1)$$

After the system updates the node embeddings, the system uses the updated node embeddings to train the sparse graph neural network on a machine learning task. The training of the sparse graph neural network is performed on the dense hardware device.

The system may repeat the above process to update the node embeddings and use the updated node embeddings to train the sparse graph neural network on the dense hardware device for a fixed number T of time steps.

Figure 3:
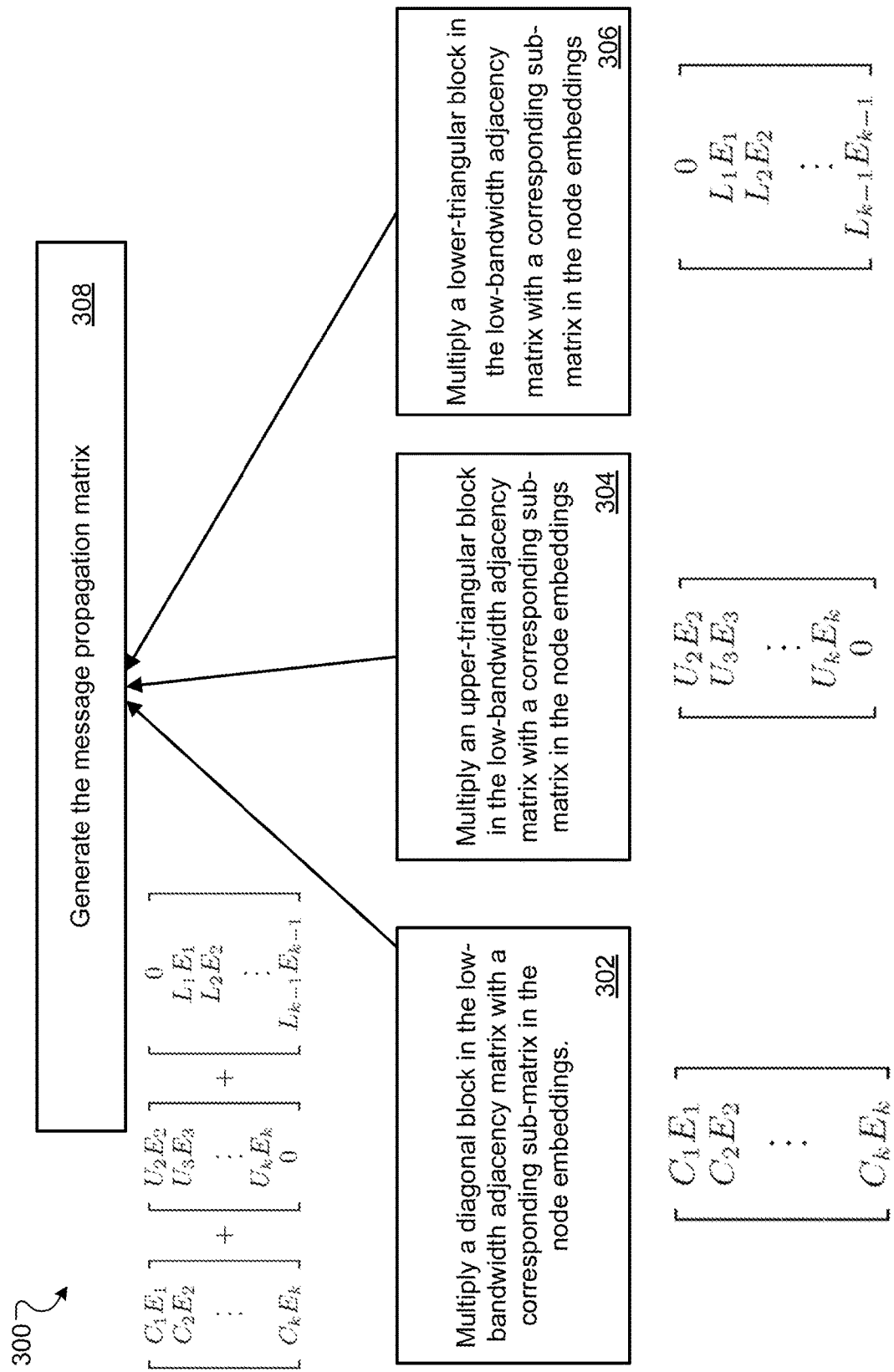
FIG. 3 is a flow diagram of an example process for generating a message propagation matrix.

FIG. 3 is a flow diagram of an example process for generating a message propagation matrix. For convenience, the process 300 will be described as being performed by a system of one or more computers located in one or more locations. For example, a neural network system, e.g., the network system 100 of FIG. 1, appropriately programmed in accordance with this specification, can perform the process 300.

The message propagation matrix represents message propagation among the nodes of the sparse graph. The message propagation matrix can be computed as a product of the low-bandwidth adjacency matrix and the current node embeddings of the nodes of the sparse graph. For example, the message propagation matrix can be computed as A×E=

$$\begin{bmatrix} C_1 & U_2 & & & \\ L_1 & C_2 & U_3 & & \\ & \ddots & \ddots & \ddots & \\ & & L_{k-2} & C_{k-1} & U_k \\ & & & L_{k-1} & C_k \end{bmatrix} \quad (3)$$

$$\begin{bmatrix} E_1 \\ E_2 \\ \vdots \\ E_{k-1} \\ E_k \end{bmatrix} = \begin{bmatrix} C_1 E_1 \\ C_2 E_2 \\ \vdots \\ \\ C_k E_k \end{bmatrix} + \begin{bmatrix} U_2 E_2 \\ U_3 E_3 \\ \vdots \\ U_k E_k \\ 0 \end{bmatrix} + \begin{bmatrix} 0 \\ L_1 E_1 \\ L_2 E_2 \\ \vdots \\ L_{k-1} E_{k-1} \end{bmatrix}$$

where A denotes the low-bandwidth adjacency matrix and E denotes the current node embeddings of the sparse graph.

To generate the message propagation matrix, the system loads the low-bandwidth adjacency matrix, the current node embeddings, and the weight matrix to a dense hardware device for dense matrix computations (or batch matrix computations (BMM)). The system then performs multiple dense matrix multiplications on the dense hardware device to compute three matrices on the right-hand side of Eq. 3. These dense matrix multiplications are fast on dense hardware.

In particular, the system performs multiple dense matrix multiplications including a multiplication of a diagonal block $C_i$ in the low-bandwidth adjacency matrix with a corresponding sub-matrix in the node embeddings (step 302). For example, to compute the first matrix on the right-hand side of Eq. 3, the system performs multiple dense matrix multiplications: $C_1 E_1, C_2 E_2, \ldots, C_k E_k$.

The system performs multiple dense matrix multiplications including a multiplication of an upper-triangular block $U_i$ in the low-bandwidth adjacency matrix with a corresponding sub-matrix in the node embeddings (step 304). For example, to compute the second matrix on the right-hand side of Eq. 3, the system performs multiple dense matrix multiplications: $U_2E_2, U_3E_3, \ldots, U_kE_k$.

The system performs multiple dense matrix multiplications including a multiplication of a lower-triangular block $L_i$ in the low-bandwidth adjacency matrix with a corresponding sub-matrix in the node embeddings (step 306). For example, to compute the third matrix on the right-hand side of Eq. 3, the system performs multiple dense matrix multiplications: $L_1E_1, L_2E_2, \ldots, L_{k-1}E_{k-1}$.

The system generate the message propagation matrix by summing the three matrices obtained at steps 302, 304 and 306 (step 308). For example, the message propagation matrix can be obtained as a result of the following summation:

$$\begin{bmatrix} C_1E_1 \\ C_2E_2 \\ \vdots \\ \\ C_kE_k \end{bmatrix} + \begin{bmatrix} U_2E_2 \\ U_3E_3 \\ \vdots \\ U_kE_k \\ 0 \end{bmatrix} + \begin{bmatrix} 0 \\ L_1E_1 \\ L_2E_2 \\ \vdots \\ L_{k-1}E_{k-1} \end{bmatrix}$$

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for updating node embeddings of a sparse graph that is an input of a sparse graph neural network, wherein each node embedding corresponds to a respective node of the sparse graph and represents feature information of the respective node and a plurality of neighboring nodes of the respective node, the method comprising:
   receiving an adjacency matrix that represents edges of the sparse graph;
   receiving a weight matrix representing, for each node of the sparse graph, a level of influence of respective neighboring nodes on the node;
   initializing, for each node of the sparse graph, a respective node embedding;
   transforming the adjacency matrix into a low-bandwidth adjacency matrix, and
   performing the following operations at least once:
      generating a message propagation matrix as a product of the low-bandwidth adjacency matrix and the node embeddings of the nodes, wherein the message propagation matrix represents message propagation among the nodes of the sparse graph, and
      updating the node embeddings of the sparse graph by processing the message propagation matrix, the node embeddings of the nodes, and the weight matrix using an encoder neural network of the sparse graph neural network.

2. The method of claim 1, wherein transforming the adjacency matrix into the low-bandwidth adjacency matrix comprises permuting the nodes in the sparse graph to obtain the low-bandwidth adjacency matrix having a bandwidth B, wherein B is a non-negative integer, and wherein all non-zero elements of the low-bandwidth adjacency matrix lie at a distance not greater than B from a main diagonal of the low-bandwidth adjacency matrix.

3. The method of claim 1, wherein the low-bandwidth adjacency matrix includes diagonal blocks, upper-triangular blocks, lower-triangular blocks, and zero elements outside of the diagonal, upper-triangular, and lower-triangular blocks.

4. The method of claim 3, wherein permuting the nodes in the sparse graph includes permuting the nodes using a heuristic algorithm.

5. The method of claim 4, wherein the heuristic algorithm is Reverse Cuthill McKee (RCMK) algorithm.

6. The method of claim 3, wherein generating the message propagation matrix as the product of the low-bandwidth adjacency matrix and the current node embeddings comprises: loading the low-bandwidth adjacency matrix and the current node embeddings to a dense hardware device for dense matrix computations.

7. The method of claim 6, wherein generating the message propagation matrix as the product of the low-bandwidth adjacency matrix and the node embeddings comprises: performing a plurality of dense matrix multiplications on the dense hardware device.

8. The method of claim 7, wherein at least one of the plurality of dense matrix multiplications performed on the dense hardware device is a multiplication of a diagonal block in the low-bandwidth adjacency matrix with a corresponding sub-matrix in the node embeddings.

9. The method of claim 7, wherein at least one of the plurality of dense matrix multiplications performed on the dense hardware device is a multiplication of an upper-triangular block in the low-bandwidth adjacency matrix with a corresponding sub-matrix in the node embeddings.

10. The method of claim 7, wherein at least one of the plurality of dense matrix multiplications performed on the dense hardware device is a multiplication of a lower-triangular block in the low-bandwidth adjacency matrix with a corresponding sub-matrix in the node embeddings.

11. The method of claim 1, where in the encoder neural network is a recurrent neural network.

12. The method of claim 11, wherein the recurrent neural network is a Gated Recurrent Unit (GRU).

13. The method of claim 1, further comprises: using the updated node embeddings of the sparse graph to train the sparse graph neural network on a machine learning task.

14. The method of claim 13, wherein the training of the sparse graph neural network is performed on a dense hardware device.

15. A system comprising one or more computers and one or more storage devices storing instructions that, when executed by the one or more computers, cause the one or more computers to perform operations for updating node embeddings of a sparse graph that is an input of a sparse graph neural network, wherein each node embedding corresponds to a respective node of the sparse graph and represents feature information of the respective node and a plurality of neighboring nodes of the respective node, the operations comprising:
receiving an adjacency matrix that represents edges of the sparse graph;
receiving a weight matrix representing, for each node of the sparse graph, a level of influence of respective neighboring nodes on the node;
initializing, for each node of the sparse graph, a respective node embedding;
transforming the adjacency matrix into a low-bandwidth adjacency matrix, and
performing the following operations at least once:
generating a message propagation matrix as a product of the low-bandwidth adjacency matrix and the node embeddings of the nodes, wherein the message propagation matrix represents message propagation among the nodes of the sparse graph, and
updating the node embeddings of the sparse graph by processing the message propagation matrix, the node embeddings of the nodes, and the weight matrix using an encoder neural network of the sparse graph neural network.

16. One or more non-transitory computer-readable storage media storing instructions that, when executed by one or more computers, cause the one or more computers to perform operations for updating node embeddings of a sparse graph that is an input of a sparse graph neural network, wherein each node embedding corresponds to a respective node of the sparse graph and represents feature information of the respective node and a plurality of neighboring nodes of the respective node, the operations comprising:
receiving an adjacency matrix that represents edges of the sparse graph;
receiving a weight matrix representing, for each node of the sparse graph, a level of influence of respective neighboring nodes on the node;
initializing, for each node of the sparse graph, a respective node embedding;
transforming the adjacency matrix into a low-bandwidth adjacency matrix, and
performing the following operations at least once:
generating a message propagation matrix as a product of the low-bandwidth adjacency matrix and the node embeddings of the nodes, wherein the message propagation matrix represents message propagation among the nodes of the sparse graph, and
updating the node embeddings of the sparse graph by processing the message propagation matrix, the node embeddings of the nodes, and the weight matrix using an encoder neural network of the sparse graph neural network.

17. The one or more non-transitory computer-readable storage media of claim 16, wherein the operations for transforming the adjacency matrix into the low-bandwidth adjacency matrix comprise: permuting the nodes in the sparse graph to obtain the low-bandwidth adjacency matrix having a bandwidth B, wherein B is a non-negative integer, and wherein all non-zero elements of the low-bandwidth adjacency matrix lie at a distance not greater than B from a main diagonal of the low-bandwidth adjacency matrix.

18. The one or more non-transitory computer-readable storage media of claim 16, wherein the low-bandwidth adjacency matrix includes diagonal blocks, upper-triangular blocks, lower-triangular blocks, and zero elements outside of the diagonal, upper-triangular, and lower-triangular blocks.

19. The one or more non-transitory computer-readable storage media of claim 16, wherein the operations for generating the message propagation matrix as the product of the low-bandwidth adjacency matrix and the node embeddings comprises: performing a plurality of dense matrix multiplications on a dense hardware device.

20. The one or more non-transitory computer-readable storage media of claim 19, wherein at least one of the plurality of dense matrix multiplications performed on the dense hardware device is a multiplication of a diagonal block in the low-bandwidth adjacency matrix with a corresponding sub-matrix in the node embeddings.

21. The one or more non-transitory computer-readable storage media of claim 19, wherein at least one of the plurality of dense matrix multiplications performed on the dense hardware device is a multiplication of an upper-triangular block in the low-bandwidth adjacency matrix with a corresponding sub-matrix in the node embeddings.

22. The one or more non-transitory computer-readable storage media of claim 19, wherein at least one of the plurality of dense matrix multiplications performed on the dense hardware device is a multiplication of a lower-triangular block in the low-bandwidth adjacency matrix with a corresponding sub-matrix in the node embeddings.

23. The one or more non-transitory computer-readable storage media of claim 16, wherein the operations further comprise: using the updated node embeddings of the sparse graph to train the sparse graph neural network on a machine learning task.

24. The one or more non-transitory computer-readable storage media of claim 23, wherein the training of the sparse graph neural network is performed on a dense hardware device.

\* \* \* \* \*